(12) United States Patent
Wada et al.

(10) Patent No.: US 9,479,064 B2
(45) Date of Patent: Oct. 25, 2016

(54) SWITCHING CONTROL CIRCUIT AND SWITCHING POWER SUPPLY DEVICE

(75) Inventors: Fumio Wada, Tokyo (JP); Yoshikazu Tsunoda, Tokyo (JP); Akira Yamamoto, Fukuoka (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/419,404

(22) PCT Filed: Aug. 27, 2012

(86) PCT No.: PCT/JP2012/071562
§ 371 (c)(1),
(2), (4) Date: Feb. 3, 2015

(87) PCT Pub. No.: WO2014/033804
PCT Pub. Date: Mar. 6, 2014

(65) Prior Publication Data
US 2015/0171756 A1    Jun. 18, 2015

(51) Int. Cl.
*H02M 3/335* (2006.01)
*H02M 1/00* (2006.01)

(52) U.S. Cl.
CPC ..... *H02M 3/33507* (2013.01); *H02M 3/33523* (2013.01); *H02M 2001/0003* (2013.01); *H02M 2001/008* (2013.01); *H02M 2001/0025* (2013.01)

(58) Field of Classification Search
CPC .............. H02M 3/325; H02M 3/335; H02M 3/33507; H02M 3/33523; H02M 3/1584; H02J 1/102
USPC .......................... 363/21.12, 21.17, 21.18, 97
See application file for complete search history.

(56) References Cited

U.S. PATENT DOCUMENTS

| | | | |
|---|---|---|---|
| 5,841,643 A | 11/1998 | Schenkel | |
| 6,518,733 B1 | 2/2003 | Schenkel et al. | |
| 6,636,021 B2 | 10/2003 | Schenkel et al. | |
| 7,292,005 B2 | 11/2007 | Pietkiewicz et al. | |
| 8,143,800 B2 | 3/2012 | Liu et al. | |
| 8,224,009 B2 | 7/2012 | Delpapa et al. | |
| 9,049,501 B2 * | 6/2015 | Delpapa ................. | H04R 3/002 |

(Continued)

FOREIGN PATENT DOCUMENTS

| | | |
|---|---|---|
| CN | 1585228 A | 2/2005 |
| CN | 101627639 A | 1/2010 |

(Continued)

OTHER PUBLICATIONS

International Search Report; PCT/JP2012/071562; Nov. 27, 2012.

(Continued)

*Primary Examiner* — Gary L Laxton
(74) *Attorney, Agent, or Firm* — Studebaker & Brackett PC

(57) ABSTRACT

A voltage detecting circuit of the present invention is formed of a differential amplifier and an H-detection filter circuit, and the differential amplifier amplifies a potential difference between an input voltage and a primary-side voltage to obtain a differential amplified voltage. The H-detection filter circuit extracts low frequency components of the differential amplified voltage to output a detection voltage. A DC/DC control IC outputs, to a control electrode of a transistor, a PWM signal obtained by shaping a pulse width based on the detection voltage, to thereby control an on/off operation of the transistor.

10 Claims, 12 Drawing Sheets

(56) References Cited

U.S. PATENT DOCUMENTS

| | | |
|---|---|---|
| 2003/0090240 A1 | 5/2003 | Schenkel et al. |
| 2004/0130299 A1 | 7/2004 | Pietkiewicz et al. |
| 2006/0226704 A1 | 10/2006 | Tsuchiya |
| 2006/0250824 A1 | 11/2006 | Wekhande et al. |
| 2007/0030713 A1 | 2/2007 | Pietkiewicz et al. |
| 2008/0212818 A1 | 9/2008 | DelPapa et al. |
| 2010/0033261 A1 | 2/2010 | Stevenson et al. |
| 2011/0228570 A1 | 9/2011 | Li et al. |
| 2013/0182859 A1 | 7/2013 | Delpapa et al. |
| 2013/0235620 A1* | 9/2013 | Morris ................ H02M 3/335 363/21.12 |

FOREIGN PATENT DOCUMENTS

| | | | |
|---|---|---|---|
| CN | 101867295 A | | 10/2010 |
| DE | 10 2006 015 395 A1 | | 10/2006 |
| JP | 2003079147 A | | 3/2003 |
| JP | 2004-328837 A | | 11/2004 |
| JP | 2005-065498 A | | 3/2005 |
| JP | 2006-246679 A | | 9/2006 |
| JP | 2011-004595 A | | 1/2011 |

OTHER PUBLICATIONS

An Office Action issued by the German Patent Office on Apr. 30, 2015, which corresponds to German Patent Application No. 11 2012 006 847.5 and is related to U.S. Appl. No. 14/419,404; with English language translation.

Notification of Concerning Transmittal of International Preliminary Report on Patentability and Translation of Written Opinion of the International Searching Authority; PCT/JP2012/071562; issued on Mar. 12, 2015.

The First Office Action issued by the Korean Patent Office on Feb. 29, 2016, which corresponds to Korean Patent Application No. 10-2015-7004557 and is related to U.S. Appl. No. 14/419,404; with English language partial translation.

A First Office Action issued by the Chinese Patent Office on Jul. 5, 2016, which corresponds to Chinese Patent Application No. 201280075483.0 and is related to U.S. Appl. No. 14/419,404; with English language partial translation.

An Office Action; "Decision of Refusal" issued by the Korean Patent Office on Aug. 19, 2016, which corresponds to Korean Patent Application No. 10-2015-7004557 and is related to U.S. Appl. No. 14/419,404; with English language partial translation.

* cited by examiner

F I G . 3
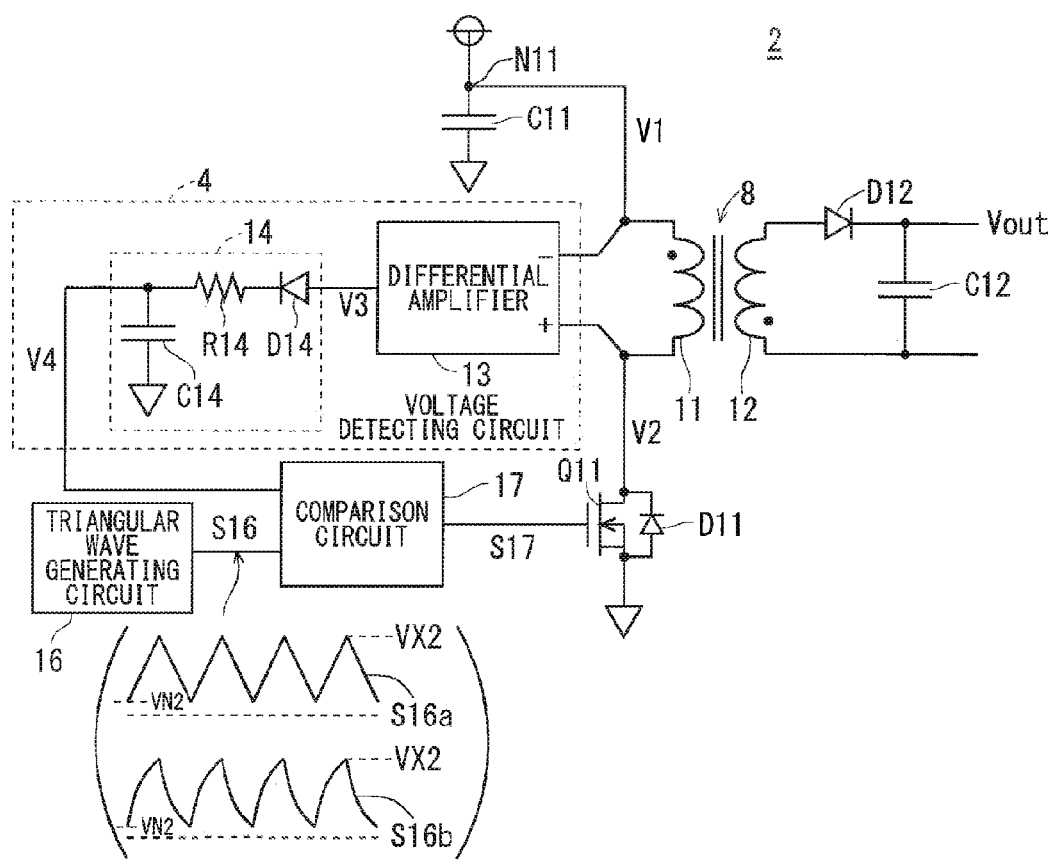

F I G . 8
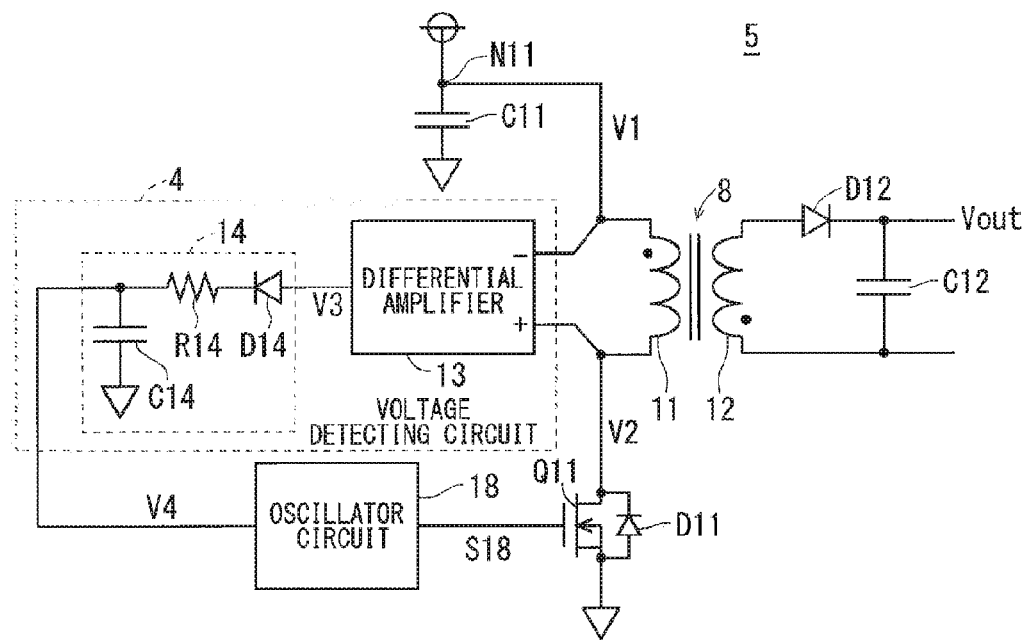

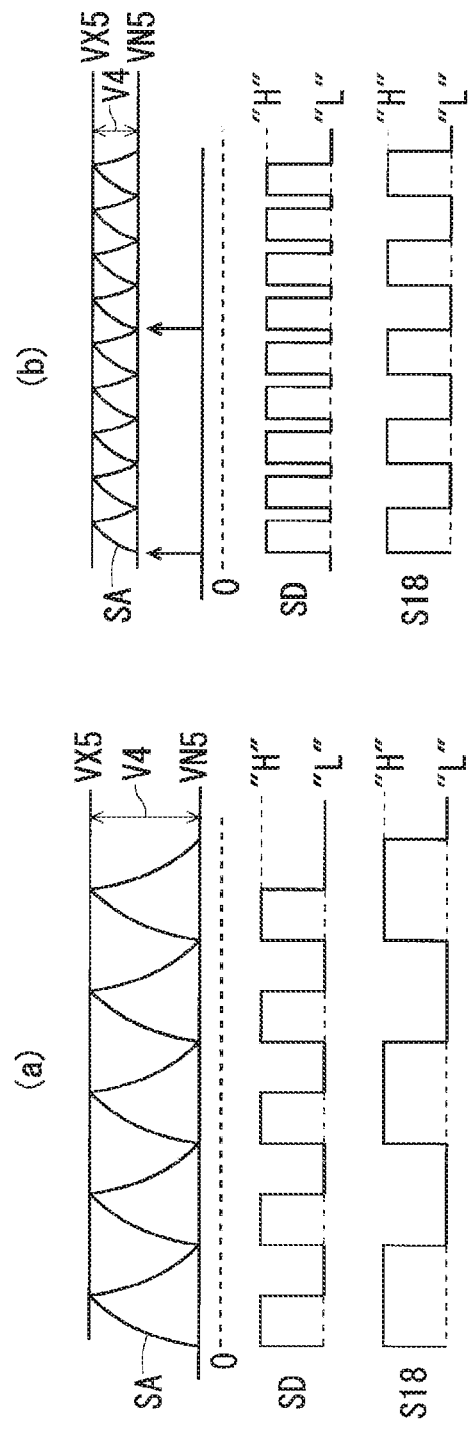

F I G . 1 0
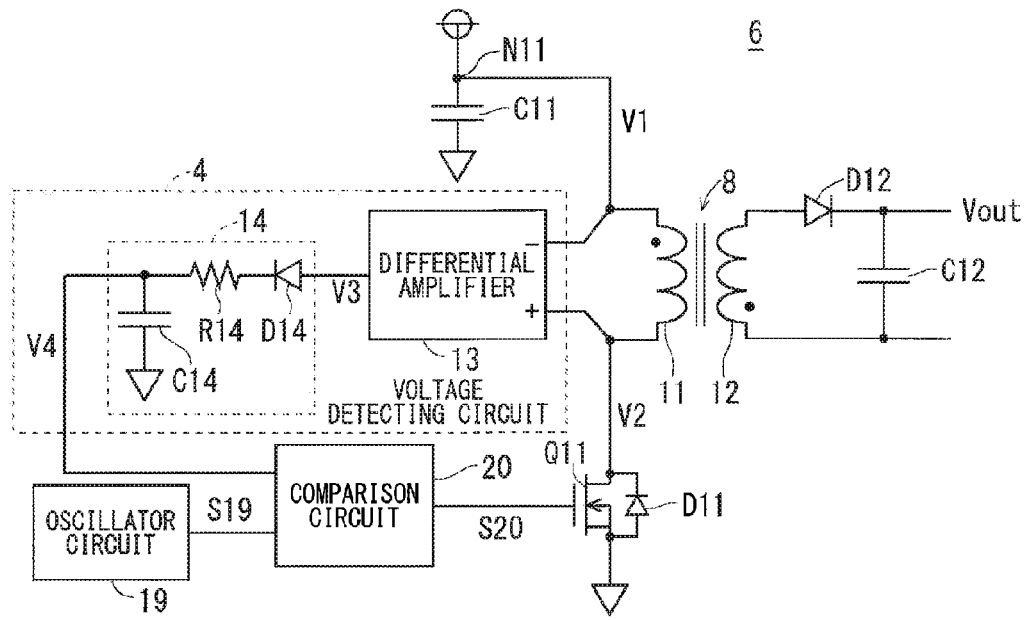
F I G . 1 1
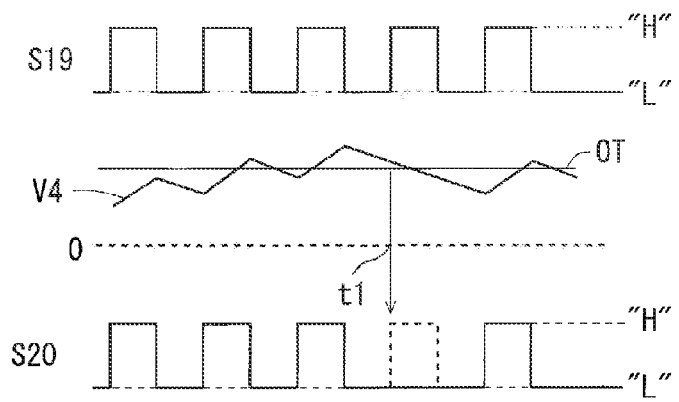

SWITCHING CONTROL CIRCUIT AND SWITCHING POWER SUPPLY DEVICE

TECHNICAL FIELD

The present invention relates to a switching control circuit for a predetermined switching power supply device including a transformer and a switching element.

BACKGROUND ART

In general, as a switching power supply device being a flyback-type DC/DC converter, Patent Document 1, for example, discloses a first configuration that rectifies a winding voltage of an auxiliary power supply winding provided separately from a primary winding and a secondary winding of a transformer to input the winding voltage as a feedback signal to a PWM circuit. Moreover, Patent Document 1 mentioned above discloses a second configuration that insulates from the voltage rectified from the secondary winding by a photocoupler to input the voltage as the feedback signal to the pulse width modulation (PWM) circuit on the primary winding side.

PRIOR ART DOCUMENT

Patent Document

Patent Document 1: Japanese Patent Application Laid-Open No. 2006-246679

SUMMARY OF INVENTION

Problems to be Solved by the Invention

In a case where the conventional switching power supply device as disclosed in Patent Document 1 is used in a general-purpose intelligent power module (IPM), a vehicle-mounted IPM, and an IGBT driving circuit that require a large number of insulating DC/DC converters (switching power supply devices), an extra insulating space is needed to be secured in order to obtain a great amount of output from one power supply transformer.

Furthermore, if a distributed power supply system (in which the switching power supply device is individually disposed in each phase of an inverter) is adopted to eliminate the extra insulating space, each power supply (device) requires a feedback signal for control. This requires a winding (auxiliary power supply winding in the first configuration) specifically for obtaining the feedback signal or requires an insulating feedback circuit (the second configuration) by the photocoupler or the like, resulting in the problem that a mounting space and a cost of the whole power supply circuit increase.

The present invention has been made in view of the above-mentioned problems, and an object thereof is to provide a switching control circuit that can achieve space savings and low costs for a predetermined switching power supply device.

Means for Solving the Problems

A switching control circuit of the present invention is a switching control circuit for a predetermined switching power supply device, the predetermined switching power supply device including: a transformer having a primary winding part and a secondary winding part; and a switching element that converts a direct current input voltage into an alternating current voltage by an on/off operation to supply the alternating current voltage to the primary winding part, the switching control circuit comprising: a differential amplifier that differentially amplifies voltages at both ends of the primary winding part to obtain an amplified voltage; a filter circuit that extracts low frequency components of the amplified voltage to obtain a detection voltage; and an operation control part that performs a control process of controlling the on/off operation of the switching element based on the detection voltage.

Effects of the Invention

The switching control circuit of the present invention performs the control process of controlling the on/off operation of the switching element by the operation control part based on the detection voltage obtained from the voltages at both the ends of the primary winding part through the differential amplifier and the filter circuit.

In this manner, the relatively simple circuit configuration formed of the differential amplifier and the filter circuit on the primary winding part side of the predetermined switching power supply device can obtain the detection voltage for controlling the switching element, so that while the switching control circuit of the present invention can achieve low costs, miniaturization, light weight, and resource savings, the on/off operation of the switching element can be controlled.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a circuit diagram illustrating a configuration of a power supply circuit of a second embodiment of the present invention;

FIG. 8 is a circuit diagram illustrating a configuration of a power supply circuit of a fifth embodiment of the present invention;

FIGS. 9(a) and (b) is a timing diagram illustrating an output operation of an oscillation gate signal by an oscillator circuit of the fifth embodiment;

FIG. 10 is a circuit diagram illustrating a configuration of a power supply circuit of a sixth embodiment of the present invention;

FIG. 11 is a timing diagram illustrating an output operation of a processed oscillation signal by a comparison circuit of the sixth embodiment;

DESCRIPTION OF EMBODIMENTS

First Embodiment

Figure 1:
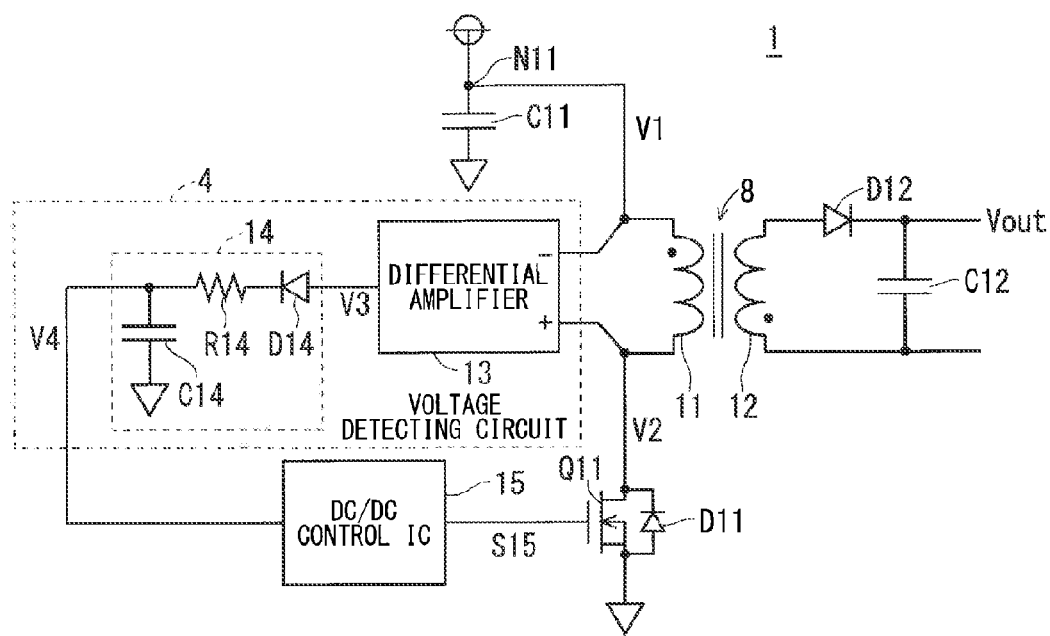
FIG. 1 is a circuit diagram illustrating a configuration of a power supply circuit of a first embodiment of the present invention.

FIG. 1 is a circuit diagram illustrating a configuration of a power supply circuit 1 (switching power supply device) of a first embodiment of the present invention.

As shown in the diagram, the power supply circuit 1 includes a transformer 8, a (NMOS) transistor Q11, a voltage detecting circuit 4, a DC/DC control IC 15, capacitors C11, C12, and diodes D11, D12, as main components.

The transformer 8 has a primary winding part 11 and a secondary winding part 12, and the primary winding part 11 and the secondary winding part 12 have the windings in different directions from each other. The primary winding part 11 at one end (upper side of FIG. 1) is connected to a node N11 between a power supply $V_{cc}$ and one electrode of the capacitor C11. Then, the other electrode of the capacitor C11 is grounded. The primary winding part 11 at the other end is connected to one electrode of the transistor Q11 and a cathode of the diode D11, and the other electrode of the transistor Q11 and an anode of the diode D11 are grounded. A voltage obtained from the one end of the primary winding part 11 is an input voltage V1 that is a direct current supplied through the node N11, and a voltage obtained from the other end of the primary winding part 11 is a primary-side voltage V2.

The secondary winding part 12 at one end (upper side of FIG. 1) is connected to an anode of the diode D12, and a cathode of the diode D12 is connected to one electrode of the capacitor C12. The secondary winding part 12 at the other end is connected to the other electrode of the capacitor C12. A voltage obtained from the one electrode of the capacitor C12 (cathode of the diode D12) is a secondary-side voltage $V_{out}$.

The voltage detecting circuit 4 is formed of a differential amplifier 13 and an H-detection filter circuit 14, and the differential amplifier 13 receives the input voltage V1 as a negative input and the primary-side voltage V2 as a positive input and amplifies a potential difference between the voltages V1, V2 to obtain a differential amplified voltage V3.

The H-detection filter circuit 14 is formed of a diode D14, a resistor R14, and a capacitor C14. An anode of the diode D14 receives the differential amplified voltage V3 that is an output of the differential amplifier 13, a cathode thereof is connected to the resistor R14 at one end, the resistor R14 at the other end is grounded through the capacitor C14, and the differential amplified voltage V3 is also output as a detection voltage V4.

The H-detection filter circuit 14 having such configuration extracts low frequency components of the differential amplified voltage V3 to output the detection voltage V4. The detection voltage V4 has an "H" level portion of the differential amplified voltage V3, namely, a voltage value that reflects a flyback voltage ΔV.

The DC/DC control IC 15 outputs, to a control electrode of the transistor Q11, a PWM signal S15 obtained by shaping a pulse width based on the detection voltage V4.

These voltage detecting circuit 4 and DC/DC control IC 15 are switching control circuits that control an on/off operation of the transistor Q11 of the power supply circuit 1.

The transistor Q11 is an N-type MOS transistor, to thereby be in an on-state during an "H" period of the PWM signal S15 and be in an off-state during an "L" period thereof. This on/off operation of the transistor Q11 converts the input voltage V1 into the primary-side voltage V2 being an alternating current that can be supplied to the primary winding part 11.

To measure the flyback voltage ΔV, in the primary-side voltage V2, generated by a fluctuation of the voltage on the secondary winding part 12 of the transformer 8, the voltage detecting circuit 4 for the feedback formed of the differential amplifier 13 and the H-detection filter circuit 14 is provided in the power supply circuit 1 being the flyback-type DC/DC converter as shown in FIG. 1, the differential amplifier 13 being differentially connected to the voltages V1, V2 at both the ends of the primary winding part 11 of the transformer 8.

Figure 2:
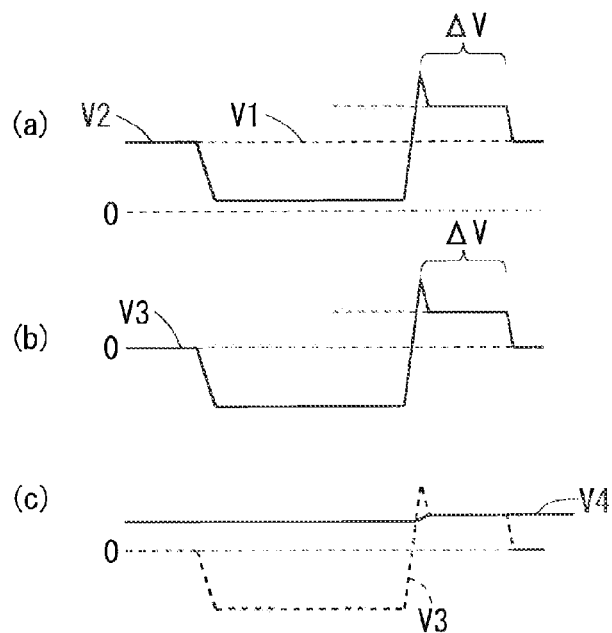
FIG. 2(a)-(c) is an explanatory diagram illustrating a detection operation by an H-detection filter circuit of the first embodiment.

FIG. 2 is an explanatory diagram illustrating a detection operation by the H-detection filter circuit 14 of a first embodiment. As shown in part (a) of FIG. 2, a period in which the flyback voltage ΔV is generated exists in the primary-side voltage V2. Therefore, the flyback voltage ΔV portion in the differential amplified voltage V3 is obtained as the positive voltage, and the detection voltage V4 having the voltage value that reflects the flyback voltage ΔV can eventually be obtained.

In general, the relationship of the voltages in the primary winding part 11 and the secondary winding part 12 is expressed by the following expression (1).

$$V_{out} + Vf1 = \Delta V \cdot N1 \cdot N2 \qquad (1)$$

The expression (1) signifies that the sum of the secondary-side voltage $V_{out}$ and the flyback voltage Vf1 received on the secondary winding part 12 side is determined by a multiplication value in which the flyback voltage ΔV received on the primary winding part 11 side is multiplied by a ratio (N2/N1) between the number of windings N1 of the primary winding part 11 and the number of windings N2 of the secondary winding part 12.

Therefore, the DC/DC control IC 15 recognizes the flyback voltage ΔV mentioned above from the detection voltage V4 and outputs the PWM signal S15 that can obtain the desirable secondary-side voltage $V_{out}$ with the application of the expression (1), whereby the control process of controlling the on/off operation of the transistor Q11 can be performed.

In this manner, the secondary-side voltage $V_{out}$ on the secondary winding part 12 is computed from the flyback voltage ΔV generated in the primary-side voltage V2 of the primary winding part 11 and the winding ratio (N2/n1) of the transformer of the primary winding part 11 and the secondary winding part 12, so that the DC/DC control IC 15 can control the feedback such that the secondary-side voltage $V_{out}$ is a control target voltage.

As described above, the switching control circuit (voltage detecting circuit 4+DC/DC control IC 15) mentioned above in the power supply circuit 1 of the first embodiment performs the control process of controlling the on/off operation of the transistor Q11 being the switching element by the DC/DC control IC 15 (operation control part) based on the detection voltage V4 obtained from the voltages V1, V2 at both the ends of the primary winding part 11 through the differential amplifier 13 and the H-detection filter circuit 14.

In this manner, the switching control circuit mentioned above of the power supply circuit 1 can obtain the detection voltage for controlling the transistor Q11 by the voltage detection circuit 4 having the relatively simple circuit configuration formed of the differential amplifier 13 and the H-detection filter circuit 14 on the primary winding part 11 side. Thus, while the switching control circuit mentioned above of the first embodiment can achieve low costs, miniaturization, light weight, and resource savings, the on/off operation of the transistor Q11 can be controlled by the PWM signal S15 of the DC/DC control IC 15.

Therefore, unlike the conventional manner, the conventional first configuration that obtains the detection voltage using the winding for the feedback or the conventional second configuration that obtains the detection voltage by the photocoupler on the primary winding part side are not required. As a result, the terminal of the transformer can be reduced compared to the first configuration mentioned above, and the photocoupler for the feedback is not required compared to the second configuration mentioned above, whereby the low costs, miniaturization, light weight, and resource savings related to the power supply circuit 1 including the switching control circuit mentioned above can be advantageously achieved.

Second Embodiment

FIG. 3 is a circuit diagram illustrating a configuration of a power supply circuit 2 (switching power supply device) of a second embodiment of the present invention.

As shown in the diagram, the power supply circuit 2 is different from the power supply circuit 1 of the first embodiment as shown in FIG. 1 in that the power supply circuit 2 is provided with a triangular generating circuit 16 and a comparison circuit 17 instead of the DC/DC control IC 15. Hereinbelow, the same components as those described in the first embodiment are denoted by the same references, and their description will be omitted as appropriate.

The triangular wave generating circuit 16 outputs, to the comparison circuit 17, a triangular wave signal S16a or a charge and discharge signal S16b as a reference signal S16, the triangular wave signal S16a and the charge and discharge signal S16b having waveforms with a minimum voltage VN2 (first voltage) as a valley and a maximum voltage VX2 (second voltage) as a peak converted over time in predetermined cycles.

The comparison circuit 17 compares the reference signal S16 and the detection voltage V4 to output a PWM signal S17 with a comparison result as "H"/"L" to the control electrode of the transistor Q11.

In the power supply circuit 2 of the second embodiment having the configuration mentioned above similar to the power supply circuit 1 of the first embodiment, the switching control circuit (voltage detecting circuit 4+triangular wave generating circuit 16+comparison circuit 17) mentioned above performs the control process of controlling the on/off operation of the transistor Q11 by the comparison circuit 17 (operation control part) similarly to the DC/DC control IC 15 based on the detection voltage V4 of the voltage detecting circuit 4, achieving effects similar to those in the first embodiment.

Furthermore, in the power supply circuit 2 of the second embodiment, the comparison circuit 17 that compares the reference signal S16 and the detection voltage V4 to obtain the PWM signal S17 achieves the operation control part, allowing for the low costs of the whole circuit since the circuit configuration can be simplified more than the DC/DC control IC 15.

First Modification

As a first modification of the power supply circuit 2 of the second embodiment, a configuration providing the comparison circuit 17 with a clamp function is conceivable.

In other words, the comparison circuit 17 in the first modification has the clamp function of clamping the detection voltage V4 such that a minimum value of the detection voltage V4 is higher than the minimum voltage VN2 of the reference signal S16. Then, the comparison circuit 17 compares the detection voltage (V4+α) after clamping and the reference signal S16 to obtain the PWM signal S17.

Figure 4:
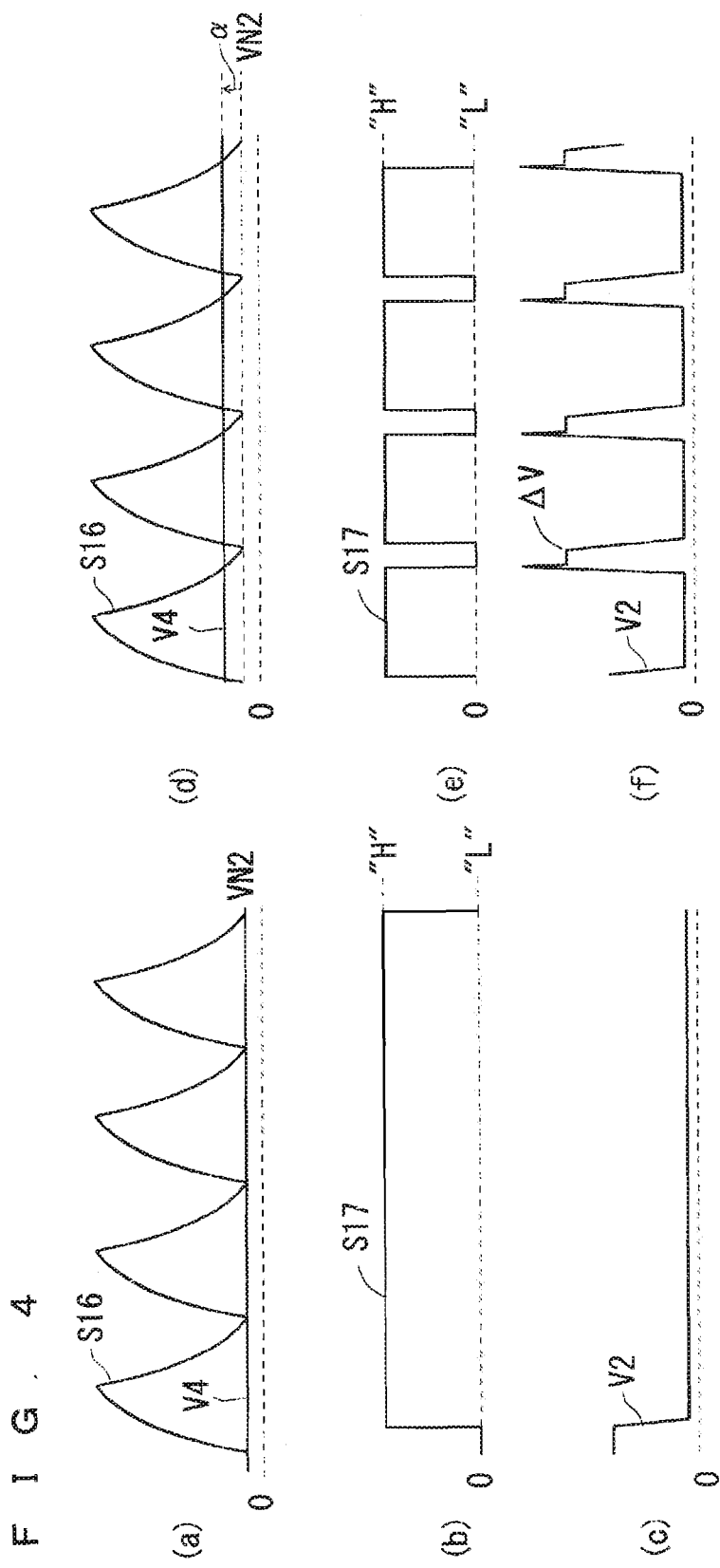
FIG. 4(a)-(f) is a timing diagram illustrating an effect of a first modification of the second embodiment.

FIG. 4 is a timing diagram illustrating an effect of the first modification of the second embodiment. Parts (a) to (c) of FIG. 4 illustrate a case where the comparison circuit 17 does not have the clamp function, and parts (d) to (f) of FIG. 4 illustrate a case where the comparison circuit 17 is provided with the clamp function.

In a case where the detection voltage V4 is changed near the minimum voltage VN2 of the reference signal S16, a relationship of S16>V4 holds true all the time as shown in part (a) of FIG. 4, the PWM signal S17 is "H" all the time to cause the transistor Q11 in the on state all the time as shown in part (b) of FIG. 4, and a control abnormal state in which the primary-side voltage V2 is stable around "0" and the flyback voltage ΔV is not generated at all may occur as shown in part (c) of FIG. 4.

On the other hand, in a case where the comparison circuit 17 has the clamp function mentioned above, a period in which the detection voltage V4 exceeds the minimum voltage VN2 of the reference signal S16 exists as shown in part (d) of FIG. 4 and the "L" period of the PWM signal S17 always occurs as shown in part (e) of FIG. 4, so that the transistor Q11 is not in the on state all the time. Therefore, as shown in part (f) of FIG. 4, the flyback voltage ΔV always occurs in the primary-side voltage V2, which can reliably avoid the possibility of the occurrence of the control abnormal state.

In addition, the detection voltage V4 is actually changed as shown in part (c) of FIG. 2, but FIG. 4 is the diagram for describing the clamp function of the comparison circuit 17, which simply illustrates the detection voltage V4 in a straight line.

In this manner, the comparison circuit 17 in the first modification of the second embodiment has the clamp function mentioned above, which can reliably avoid the control abnormal in which the PWM signal S17 fixes the transistor Q11 being the switching element in the on state all the time.

In addition, the first modification shows the example of providing the comparison circuit 17 with the clamp function mentioned above, and a configuration that provides the H-detection filter circuit 14 with the clamp function mentioned above or includes a clamp circuit with the clamp function mentioned above between the H-detection filter circuit 14 and the comparison circuit 17 is also conceivable.

Second Modification

As a second modification of the power supply circuit 2 of the second embodiment, a configuration providing the comparison circuit 17 with a reference signal lowering function is conceivable.

In other words, the comparison circuit 17 has the reference signal lowering function of lowering the reference signal S16 such that the minimum voltage VN2 of the reference signal S16 of the triangular wave generating circuit 16 is less than "0" V (minimum value of the minimum voltage VN2). Moreover, the comparison circuit 17 can obtain the PWM signal S17 by comparing the reference signal S16 and the detection voltage V4, the reference signal S16 having the minimum value VNα less than "0".

Figure 5:
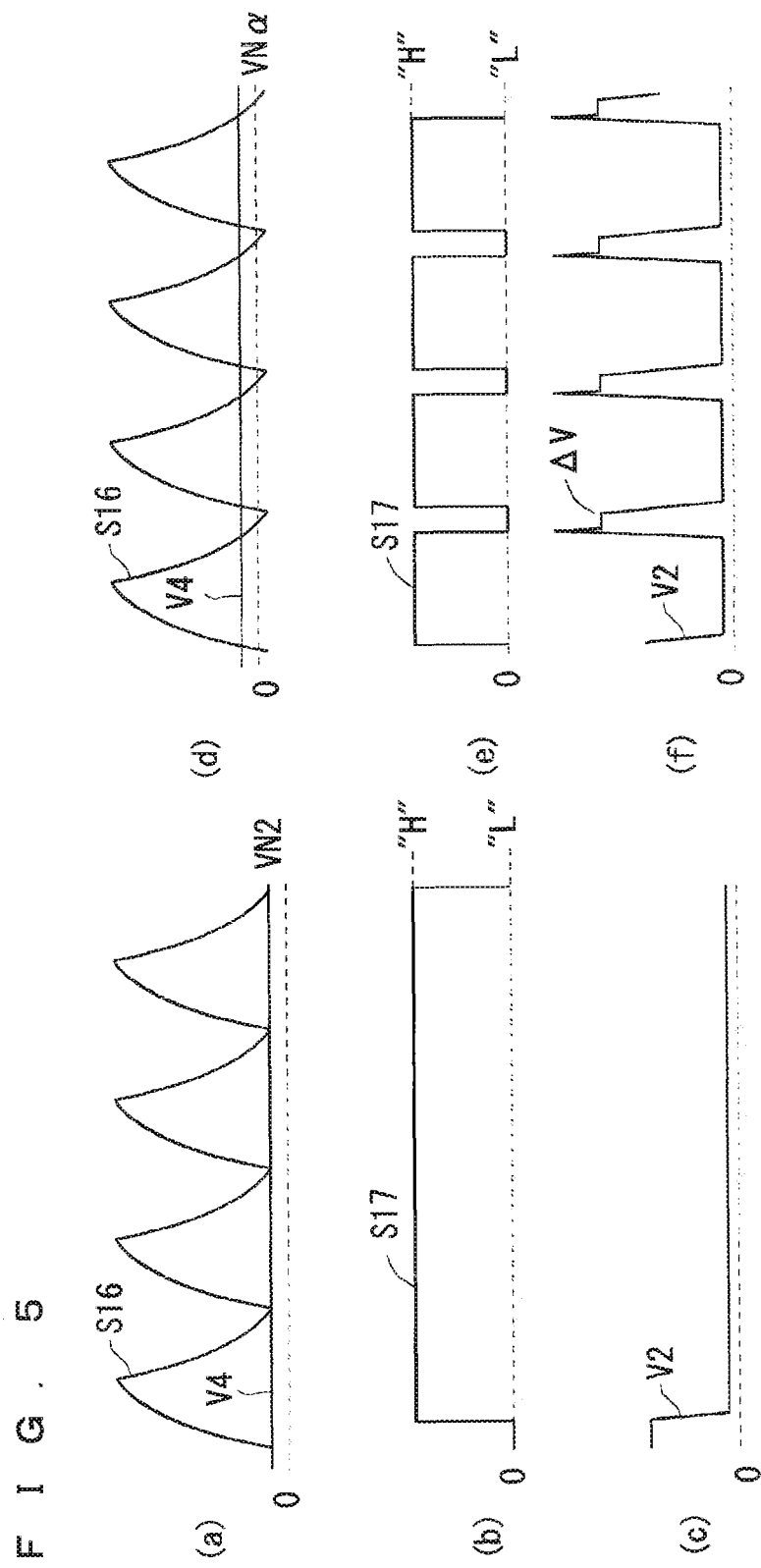
FIG. 5(a)-(f) is a timing diagram illustrating an effect of a second modification of the second embodiment.

FIG. 5 is a timing diagram illustrating an effect of the second modification of the second embodiment. Parts (a) to (c) of FIG. 5 illustrate a case where the triangular wave generating circuit 16 does not have the reference signal lowering function, and parts (d) to (f) of FIG. 5 illustrate a case where triangular wave generating circuit 16 is provided with the reference signal lowering function.

In a case where the detection voltage V4 is changed near the minimum voltage VN2 of the reference signal S16 as shown in part (a) of FIG. 5, the PWM signal S17 is "H" all the time to cause the transistor Q11 in the on state all the time as shown in part (b) of FIG. 5, and a control abnormal in which the primary-side voltage V2 is stable around "0" and the flyback voltage ΔV is not generated at all may occur as shown in part (c) of FIG. 5.

On the other hand, in a case where the triangular wave generating circuit 16 has the reference signal lowering function mentioned above, a period in which the detection voltage V4 exceeds the minimum voltage VNα of the reference signal S16 exists as shown in part (d) of FIG. 5 and the "L" period of the PWM signal S17 always occurs as shown in part (e) of FIG. 5, whereby the transistor Q11 is not in the on state all the time. Therefore, as shown in part (f) of FIG. 5, the flyback voltage ΔV always occurs in the primary-side voltage V2, which can reliably avoid the possibility of the occurrence of the control abnormal state.

In addition, the detection voltage V4 is actually changed as shown in part (c) of FIG. 2, but FIG. 5 is the diagram for describing the reference signal lowering function of the triangular wave generating circuit 16, which simply illustrates the detection voltage V4 in a straight line.

In this manner, the second modification of the second embodiment sets the minimum voltage VN2 (first voltage) of the reference signal S16 to be a voltage lower than the minimum value ("0" V) of the detection voltage V4 by the reference voltage lowering function of the triangular generating circuit 16, which can reliably avoid the control abnormal in which the PWM signal S17 fixes the transistor Q11 in the on state all the time.

In addition, the second modification shows the example of providing the triangular wave generating circuit 16 with the reference voltage lowering function, and a configuration that provides the comparison circuit 17 with the reference voltage lowering function described above or includes a circuit having the reference voltage lowering function mentioned above interposed between the triangular wave generating circuit 16 and the comparison circuit 17 is also conceivable.

Third Embodiment

Figure 6:
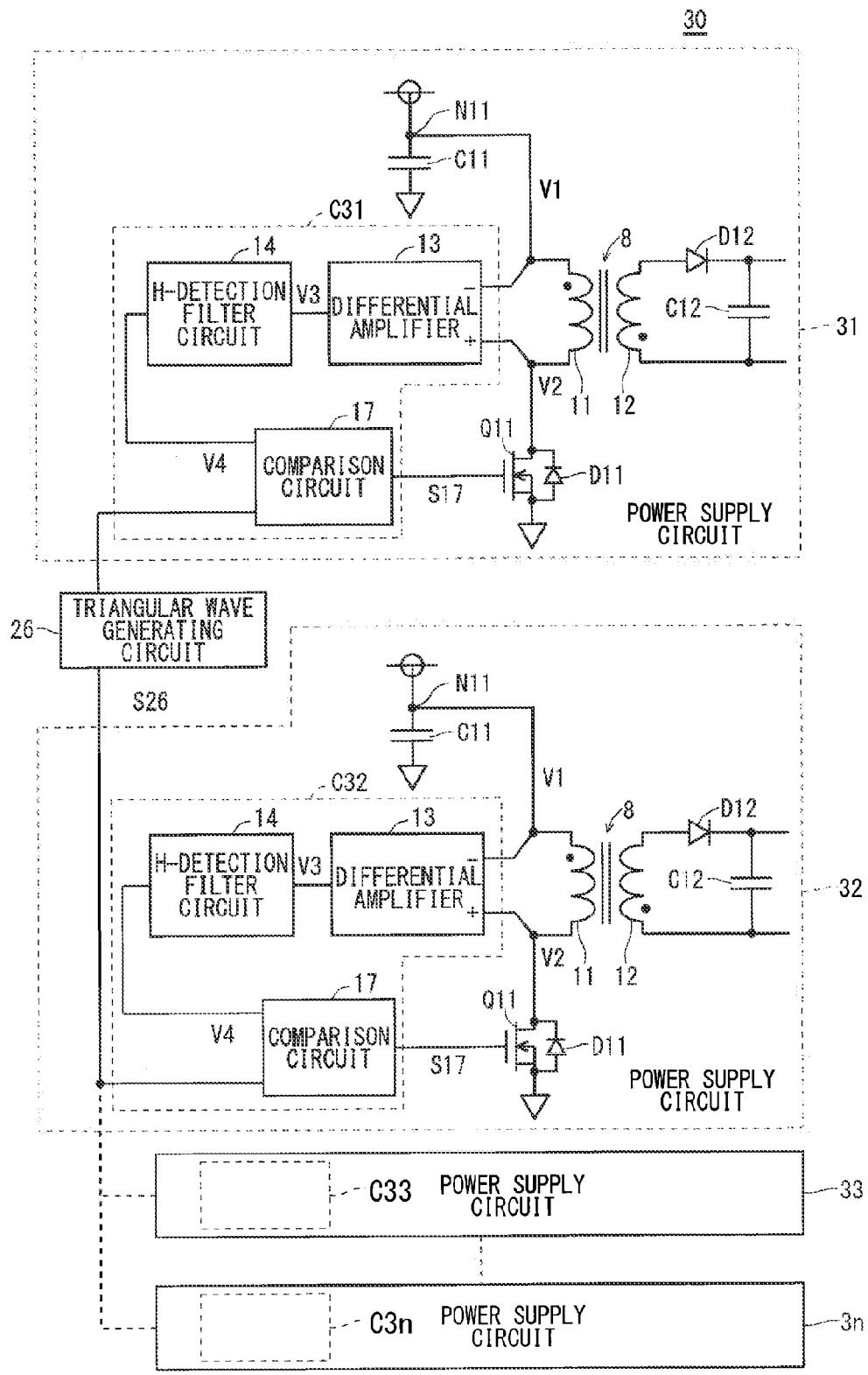
FIG. 6 is a circuit diagram illustrating a configuration of a power supply circuit of a third embodiment of the present invention.

FIG. 6 is a circuit diagram illustrating a configuration of a power supply circuit group 30 (switching power supply device) of a third embodiment of the present invention.

As shown in the diagram, the power supply circuit group 30 is formed of n (n≥2) power supply circuits 31 to 3n. The power supply circuits 31 to 3n each has the configuration similar to that of the power supply circuit 2 of the second embodiment shown in FIG. 3 except for that a triangular wave generating circuit 26 (corresponding to the triangular wave generating circuit 16 in FIG. 3) is not provided, and the power supply circuits 31 to 3n include operation control combination circuits C31 to C3n formed of the differential amplifiers 13, the H-detection filter circuits 14, and the comparison circuits 17. In other words, n operation control combination circuits C31 to C3n are provided in the power supply circuit group 30 correspondingly to the n power supply circuits 31 to 3n.

Then, the triangular wave generating circuit 26 is shared between n comparison circuits 17 of the operation control combination circuits C31 to C3n. In other words, the one triangular wave generating circuit 26 is shared with the n power supply circuits 31 to 3n (operation control combination circuits C31 to C3n), and a reference signal S26 is input in common to the comparison circuit 17 of each of the operation control combination circuits C31 to C3n.

Therefore, in the power supply circuit group 30 of the third embodiment, the operation control combination circuits C31 to C3n, respectively, in the power supply circuits 31 to 3n input the reference signal S26 in common, and thus the comparison circuit 17 (operation control part) similar to the switching control circuit of the second embodiment can perform the control process of controlling the on/off operation of the corresponding transistor Q11 of the power supply circuits 31 to 3n based on the detection voltage V4 of the voltage detecting circuit 4.

In this manner, the power supply circuit group 30 of the third embodiment shares the triangular wave generating circuit 26 between the plurality of (n) operation control combination circuits C31 to C3n to simplify the circuit configuration (operation control combination circuits C31 to C3n+triangular wave generating circuit 26) of the switching control circuit corresponding to the plurality of (n) power supply circuits 31 to 3n, allowing for the low costs and the space savings.

Fourth Embodiment

Figure 7:
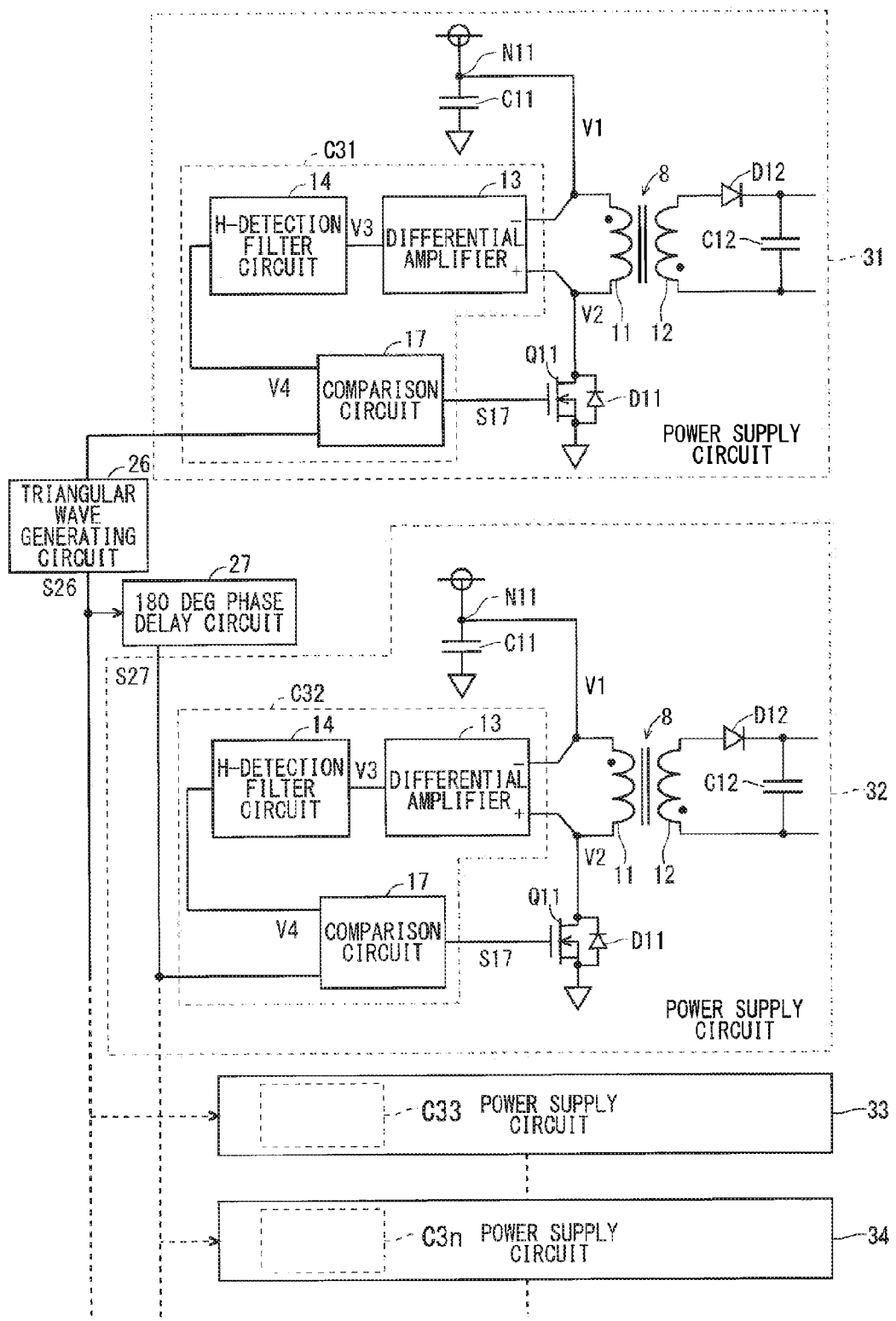
FIG. 7 is a circuit diagram illustrating a configuration of a power supply circuit of a fourth embodiment of the present invention.

FIG. 7 is a circuit diagram illustrating a configuration of a power supply circuit group 40 (switching power supply device) of a fourth embodiment of the present invention.

The power supply circuit group 40 similar to the power supply circuit group 30 of the third embodiment is formed of the n power supply circuits 31 to 3n (FIG. 7 shows 31 to 34), and n operation control combination circuits C31 to C3n corresponding to the n power supply circuits 31 to 3n are provided.

Then, the triangular wave generating circuit 26 and a 180 deg (180 degrees) phase delay circuit 27 are shared between n comparison circuits 17 of the operation control combination circuits C31 to C3n. In other words, the one triangular wave generating circuit 26 and the one 180 deg phase delay circuit 27 are shared with the n power supply circuits 31 to 3n (operation control combination circuits C31 to C3n).

The 180 deg phase delay circuit 27 receives the reference signal S26 and outputs a phase delay reference signal S27 (phase shift reference signal) in which the reference signal S26 is delayed by a phase of 180 degrees.

Then, the reference signal S26 is applied as a comparison reference signal to the comparison circuits 17 of the power supply circuits 31, 33, . . . , and the phase delay reference signal S27 is applied as a comparison reference signal to the comparison circuits 17 of the power supply circuits 32, 34, . . . . In addition, the comparison reference signal is a generic name for a signal including the reference signal S26 and the phase delay reference signal S27.

Therefore, in the power supply circuit group 40 of the fourth embodiment, the operation control combination circuits C31 to C3n, respectively, in the power supply circuits 31 to 3n input the reference signal S26 or the phase delay reference signal S27 as the comparison reference signal. Therefore, in the fourth embodiment similar to the third embodiment, the comparison circuit 17 (operation control part) can perform the control process of controlling the on/off operation of the corresponding transistor Q11 of the power supply circuits 31 to 3n based on the detection voltage V4 of the voltage detecting circuit 4.

In this manner, the power supply circuit group 40 of the fourth embodiment similar to the power supply circuit group 30 of the third embodiment shares the triangular wave generating circuit 26 and the 180 deg phase delay circuit 27 between the plurality of (n) operation control combination circuits C31 to C3n to simplify the circuit configuration of the switching control circuit corresponding to the plurality of (n) power supply circuits 31 to 3n, allowing for the low costs and the space savings.

Furthermore, in the power supply circuit group 40 of the fourth embodiment, the plurality of operation control combination circuits C31 to C3n are each configured to selectively input one signal of the reference signal S26 and the phase delay reference signal S27 to the comparison circuit 17. Thus, the comparison reference signals S26 and S27 that pass through the plurality of operation control combination circuits C31 to C3n are distributed to two phases to decrease a current effective value, which can reliably avoid a phenomenon in which a current consumption is concentrated during certain time periods.

In addition, in this embodiment, the 180 deg phase delay circuit 27 delays the reference signal S26 by 180 degrees (deg) to generate the phase delay reference signal S27, but a signal in which a phase of the reference signal S26 is shifted except for 180 degrees may be used as the phase delay reference signal S27. It should be noted that the configuration delaying a phase by 180 degrees can simplify the circuit configuration provided with an inverting logic circuit serving as the 180 deg phase delay circuit 27.

Fifth Embodiment

FIG. 8 is a circuit diagram illustrating a configuration of a power supply circuit 5 (switching power supply device) of a fifth embodiment of the present invention.

As shown in the diagram, an oscillator circuit 18 is provided instead of the DC/DC control IC 15, which is different from the power supply circuit 1 of the first embodiment shown in FIG. 1. Hereinbelow, the same components as those described in the first embodiment are denoted by the same references, and their description will be omitted as appropriate.

The oscillator circuit 18 receives the detection voltage V4 to output, to the control electrode of the transistor Q11, an oscillation gate signal S18 that oscillates at frequency based on a voltage value of the detection voltage V4.

FIG. 9 is a timing diagram illustrating an output operation of the oscillation gate signal S18 by the oscillator circuit 18 of the fifth embodiment. As shown in part (a) of FIG. 9, in a case where the detection voltage V4 is relatively great, a potential difference between an upper limit voltage VX5 and a minimum voltage VN5 is set to be great, and thus an internal signal SA of the oscillator circuit 18 oscillates at a relatively small frequency. After the oscillator circuit 18 shapes a waveform of the internal signal SA into a waveform of a digital signal SD, a duty ratio is adjusted to be 50%, whereby the oscillation gate signal S18 at a relatively small oscillation frequency can be obtained.

On the other hand, as shown in part (b) of FIG. 9, in a case where the detection voltage V4 is relatively small, the potential difference between the upper limit voltage VX5 and the minimum voltage VN5 is set to be small, and thus the internal signal SA of the oscillator circuit 18 oscillates at a relatively great frequency. After the oscillator circuit 18 shapes the waveform of the internal signal SA into the waveform of the digital signal SD, the duty ratio is adjusted to be 50%, whereby the oscillation gate signal S18 at a relatively great oscillation frequency can be obtained.

In the power supply circuit 5 of the fifth embodiment having the configuration mentioned above similar to the power supply circuit 1 of the first embodiment, the switching control circuit (voltage detecting circuit 4+oscillator circuit 18) mentioned above performs the control process of controlling the on/off operation of the transistor Q11 by the oscillator circuit 18 (operation control part) similar to the DC/DC control IC 15 based on the detection voltage V4 of the voltage detecting circuit 4, achieving effects similar to those in the first embodiment.

Furthermore, in the power supply circuit 5 of the fifth embodiment, the oscillator circuit 18 that obtains the oscillation gate signal S18 oscillating at the frequency based on the detection voltage V4 achieves the operation control part, allowing for the low costs of the whole circuit since the circuit configuration can be simplified more than the DC/DC control IC 15.

Furthermore, a control algorithm is based on the same concept as a ringing choke converter (RCC), the control algorithm outputting the oscillation gate signal S18 obtained by the oscillator circuit 18 mentioned above that performs a frequency modulation based on the detection voltage V4.

In other words, if the oscillation frequency of the oscillation gate signal S18 doubles, the current that passes through the primary winding part 11 side and the secondary winding part 12 side of the power supply circuit 5 is ½. If an inductance on the secondary winding part 12 side is represented by L, the current passing through the secondary winding part 12 side is represented by 1, and a frequency is represented by f, an output power on the secondary-side voltage $V_{out}$ side is expressed by $[(½) \times L \times l^2 \times f]$, to thereby control the output power mentioned above to be $[½\{=(½)^2 \times 2\}]$ if the oscillation frequency doubles.

Using square control characteristics to generate the oscillation gate signal S18 allows the switching control circuit to be configured without using the PWM circuit such as the complex DC/DC control IC 15, achieving effects similar to those of the first embodiment.

Furthermore, the oscillation frequency of the oscillation gate signal S18 of the power supply circuit 5 is modulated based on the detection voltage V4, and thus in a case where the plurality of power supply circuits 5 such as the power supply circuit group 30 of the third embodiment or the power supply circuit group 40 of the fourth embodiment are configured, a consequence of the different oscillation frequencies of the oscillation gate signal S18 between the plurality of power supply circuits 5 enables the current on the primary winding part 11 side to be distributed along a time direction, whereby the current effective value can be decreased and radiation noise can also be suppressed.

For example, in a case where a plurality of power supply circuits are configured, the adjacent power supply circuits in a state of being close to each other have the same generation timing of a flyback voltage ΔV to each other, and then "radiation noise" is superimposed on each other, which easily generates a great radiation noise. On the other hand, in a case where the plurality of power supply circuits 5 are configured, even if the adjacent power supply circuits 5 are in a state of being close to each other, the different frequencies of the oscillation gate signal S18 between the adjacent power supply circuits 5, 5 enable to shift the generation timing of the flyback voltage ΔV, and thus a peak of "radiation noise" can be suppressed. Furthermore, the adjacent power supply circuits keep a distance therebetween, whereby an enhanced effect of suppressing the radiation noise can be obtained.

Sixth Embodiment

FIG. 10 is a circuit diagram illustrating a configuration of a power supply circuit 6 (switching power supply device) of a sixth embodiment of the present invention.

As shown in the diagram, an oscillator circuit 19 and a comparison circuit 20 are provided instead of the DC/DC control IC 15, which is different from the power supply circuit 1 of the first embodiment shown in FIG. 1. Hereinbelow, the same components as those described in the first embodiment are denoted by the same references, and their description will be omitted as appropriate.

The oscillator circuit 19 generates a reference oscillation signal S19 at a predetermined frequency. The comparison circuit 20 receives the reference oscillation signal S19 and the detection voltage V4 to output a processed oscillation signal S20 to the control electrode of the transistor Q11 based on a comparison result between the detection voltage V4 and a target voltage OT, the processed oscillation signal S20 being subjected to a process of thinning out a generation pulse of the reference oscillation signal S19 as required.

FIG. 11 is a timing diagram illustrating an output operation of the processed oscillation signal S20 by the comparison circuit 20 of the sixth embodiment. As shown in the diagram, the reference oscillation signal S19 is kept as it is and output as the processed oscillation signal S20 at the time period in which the detection voltage V4 falls short of the target voltage OT. On the other hand, in a case where the detection voltage V4 exceeds the target voltage OT at a detection time t1 being a generation timing of an "H" pulse, the fixed processed oscillation signal S20 is output with the "H" pulse of the reference oscillation signal S19 being thinned out, for example.

In this manner, the comparison circuit 20 outputs the processed oscillation signal S20 with the "H" pulse being thinned out at the time period in which the detection voltage V4 exceeds the target voltage OT, and thus the detection voltage V4 can be controlled to approach the target voltage OT. Therefore, the target voltage OT corresponding to the secondary-side voltage $V_{out}$ to be a desirable target value is set in advance, which can control the on/off operation of the transistor Q11 to make the secondary-side voltage $V_{out}$ to be the desirable target value mentioned above.

In the power supply circuit 6 of the sixth embodiment having the configuration mentioned above similar to the power supply circuit 1 of the first embodiment, the switching control circuit (voltage detecting circuit 4+oscillator circuit 19+comparison circuit 20) mentioned above performs the control process of controlling the on/off operation of the transistor Q11 by the comparison circuit 20 (operation control part) similarly to the DC/DC control IC 15 based on the detection voltage V4 of the voltage detecting circuit 4, achieving effects similar to those in the first embodiment.

Furthermore, in the power supply circuit 6 of the sixth embodiment, the comparison circuit 20 that obtains the processed oscillation signal S20 processed from the reference oscillation signal S19 based on the detection voltage V4 achieves the operation control part, allowing for the low costs of the whole circuit since the circuit configuration can be simplified more than the DC/DC control IC 15.

Seventh Embodiment

Figure 12:
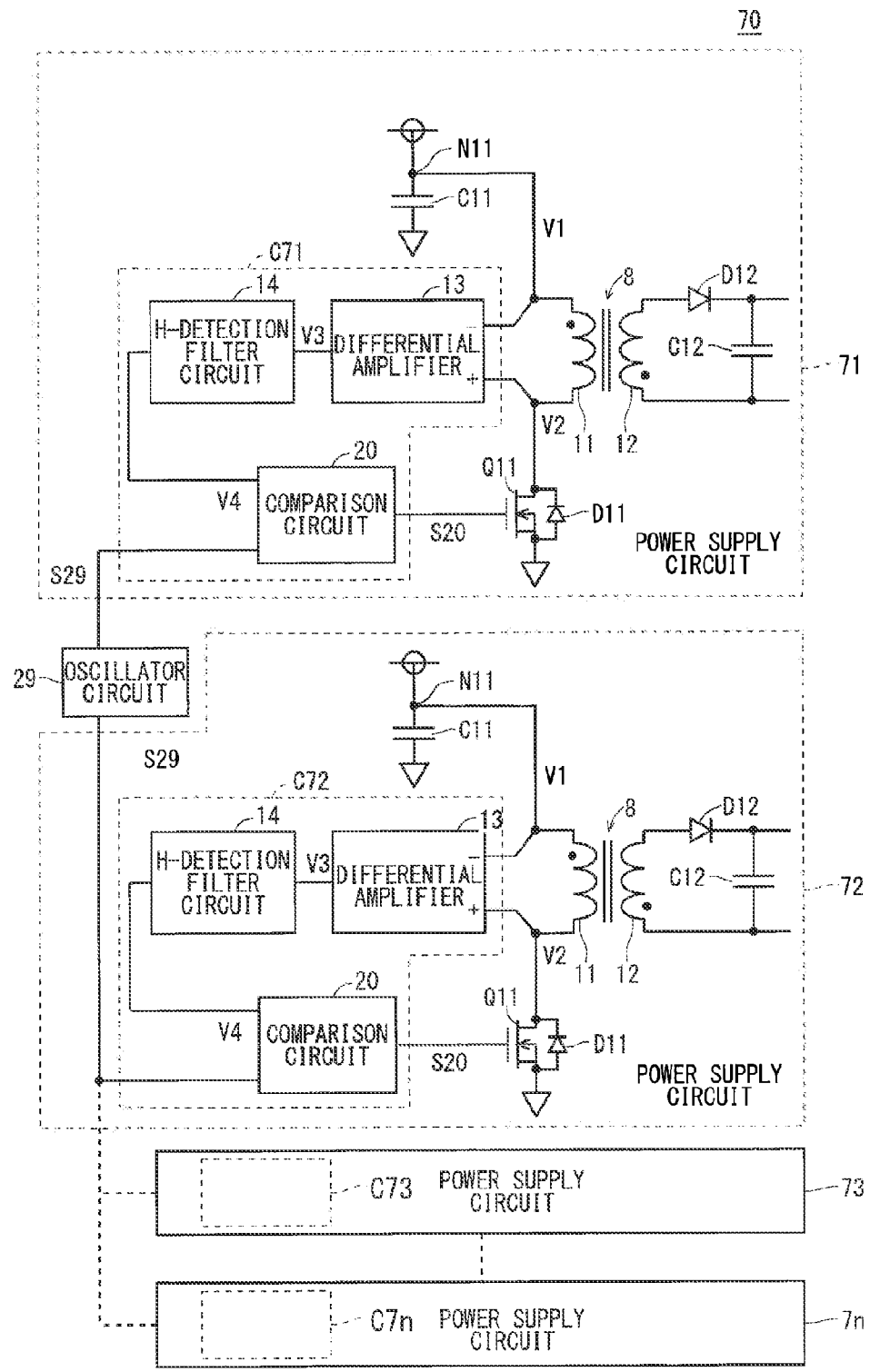
FIG. 12 is a circuit diagram illustrating a configuration of a power supply circuit of a seventh embodiment of the present invention.

FIG. 12 is a circuit diagram illustrating a configuration of a power supply circuit group 70 (switching power supply device) of a seventh embodiment of the present invention.

As shown in the diagram, the power supply circuit group 70 is formed of n (n≥2) power supply circuits 71 to 7n. The power supply circuits 71 to 7n each has the configuration similar to that of the power supply circuit 6 of the sixth embodiment shown in FIG. 10 except for that an oscillator circuit 29 (corresponding to the oscillator circuit 19 in FIG. 10) is not provided, and the power supply circuits 71 to 7n include operation control combination circuits C71 to C7n formed of the differential amplifiers 13, the H-detection filter circuits 14, and the comparison circuits 20. In other words, n operation control combination circuits C71 to C7n are provided correspondingly to the n power supply circuits 71 to 7n.

Then, the oscillator circuit 29 is shared between n comparison circuits 20 of the operation control combination circuits C71 to C7n. In other words, the one oscillator circuit 29 is shared with the n power supply circuits 71 to 7n (operation control combination circuits C71 to C7n), and a common oscillation signal S29 is input in common to the comparison circuit 20 of each of the operation control combination circuits C71 to C7n.

Therefore, in the power supply circuit group 70 of the seventh embodiment, the operation control combination circuits C71 to C7n, respectively, in the power supply circuits 71 to 7n input the common oscillation signal S29 in common, and thus the comparison circuit 20 (operation control part) similar to the switching control circuit (voltage detecting circuit 4+oscillator circuit 19+comparison circuit 20) of the sixth embodiment can perform the control process of controlling the on/off operation of the corresponding transistor Q11 of the power supply circuits 71 to 7n based on the detection voltage V4 of the voltage detecting circuit 4.

In this manner, the power supply circuit group 70 of the seventh embodiment shares the oscillator circuit 29 between the plurality of (n) operation control combination circuits C71 to C7n to simplify the circuit configuration (operation control combination circuits C71 to C7n+oscillator circuit 29) of the switching control circuit corresponding to the plurality of (n) power supply circuits 71 to 7n, allowing for the low costs and the space savings.

Eighth Embodiment

Figure 13:
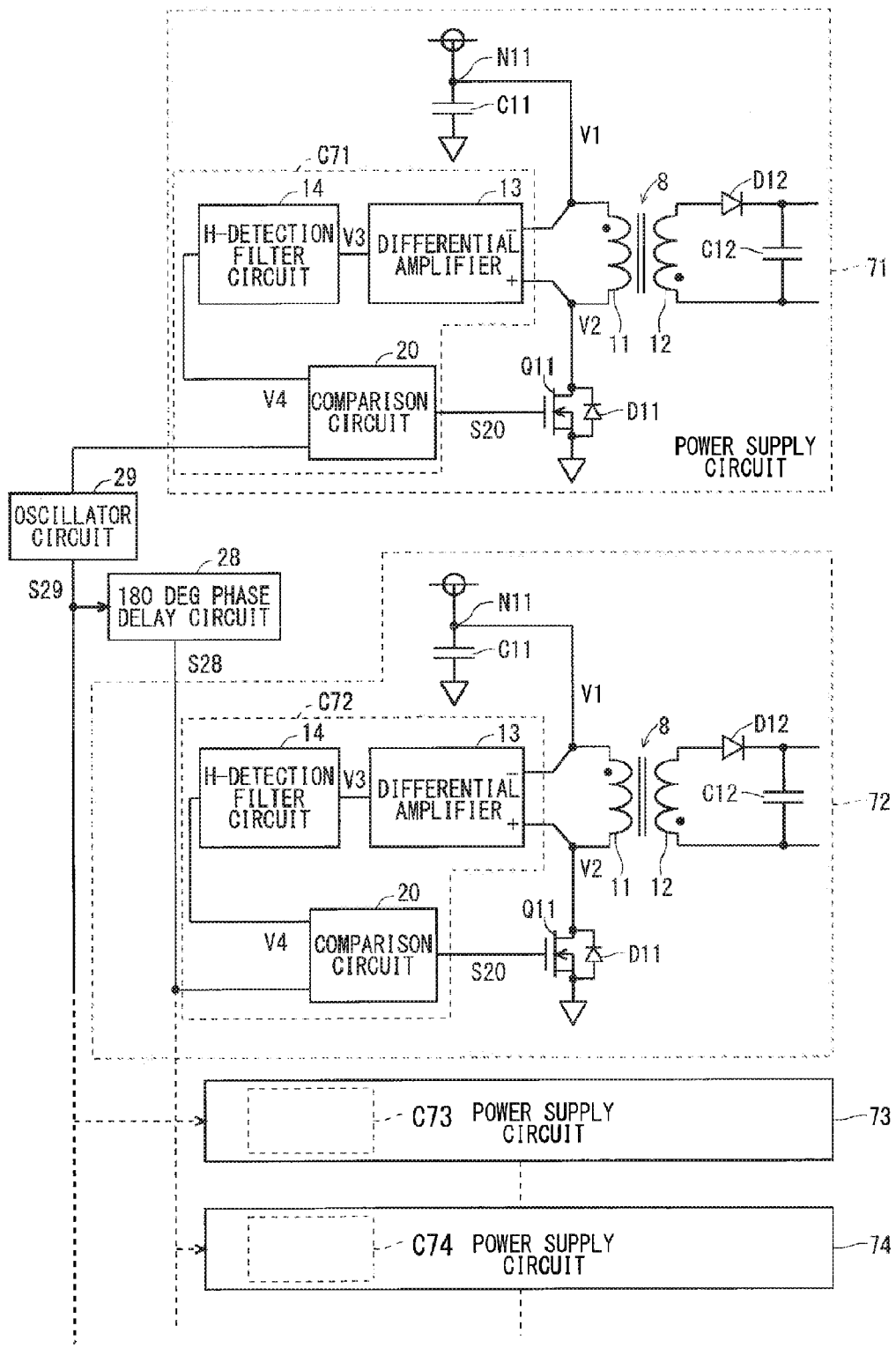
FIG. 13 is a circuit diagram illustrating a configuration of a power supply circuit of an eighth embodiment of the present invention.

FIG. 13 is a circuit diagram illustrating a configuration of a power supply circuit group 80 (switching power supply device) of an eighth embodiment of the present invention.

The power supply circuit group 80 similar to the power supply circuit group 70 of the seventh embodiment is formed of the n power supply circuits 71 to 7n (FIG. 13 shows 71 to 74). The n operation control combination circuits C71 to C7n are provided correspondingly to the n power supply circuits 71 to 7n.

Then, the oscillator circuit 29 and a 180 deg phase delay circuit 28 are shared between n comparison circuits 20 of the operation control combination circuits C71 to C7n. In other words, the one oscillator circuit 29 and the 180 deg phase delay circuit 28 are shared with the n power supply circuits 71 to 7n (operation control combination circuits C71 to C7n).

The 180 deg phase delay circuit 28 receives the common oscillation signal S29 (reference oscillation signal) to output a phase delay oscillation signal S28 (phase shift reference oscillation signal) in which the common oscillation signal S29 is delayed by a phase of 180 degrees.

Then, the common oscillation signal S29 is applied as a comparison reference oscillation signal to the comparison circuits 20 of the power supply circuits 71, 73, . . . , and the phase delay oscillation signal S28 is applied as a comparison reference oscillation signal to the comparison circuits 20 of the power supply circuits 72, 74, . . . . In addition, the comparison reference oscillation signal is a generic name for a signal including the common oscillation signal S29 and the phase delay oscillation signal S28.

Therefore, in the power supply circuit group 80 of the eighth embodiment, the operation control combination circuits C71 to C7n, respectively, in the power supply circuits 71 to 7n input the common oscillation signal S29 or the phase delay oscillation signal S28 as the comparison reference signal. Therefore, in the eighth embodiment similar to the seventh embodiment, the comparison circuit 20 (operation control part) can perform the control process of controlling the on/off operation of the corresponding transistor Q11 of the power supply circuits 71 to 7n based on the detection voltage V4 of the voltage detecting circuit 4.

In this manner, the power supply circuit group 80 of the eighth embodiment similar to the power supply circuit group 70 of the seventh embodiment shares the oscillator circuit 29 and the 180 deg phase delay circuit 28 between the plurality of (n) operation control combination circuits C71 to C7n to simplify the circuit configuration of the switching control circuit corresponding to the plurality of (n) power supply circuits 71 to 7n, allowing for the low costs and the space savings.

Furthermore, in the power supply circuit group 80 of the eighth embodiment, the plurality of operation control combination circuits C71 to C7n are configured to selectively input one signal of the common oscillation signal S29 and the phase delay oscillation signal S28 to the comparison circuit 20, and thus the comparison common oscillation signals S29, S27 that pass through the plurality of operation control combination circuits C71 to C7n are distributed to two phases to decrease the current effective value, which can reliably avoid a phenomenon in which the current consumption is concentrated during certain time periods.

In addition, in this embodiment, the 180 deg phase delay circuit 28 delays the common oscillation signal S29 by 180 degrees to generate the phase delay oscillation signal S28, but a signal in which a phase of the common oscillation signal S29 is shifted except for 180 degrees may be used as the phase delay oscillation signal S28. It should be noted that the configuration delaying a phase by 180 degrees can simplify the circuit configuration provided with the inverting logic circuit serving as the 180 deg phase delay circuit 28.

Ninth Embodiment

Figure 14:
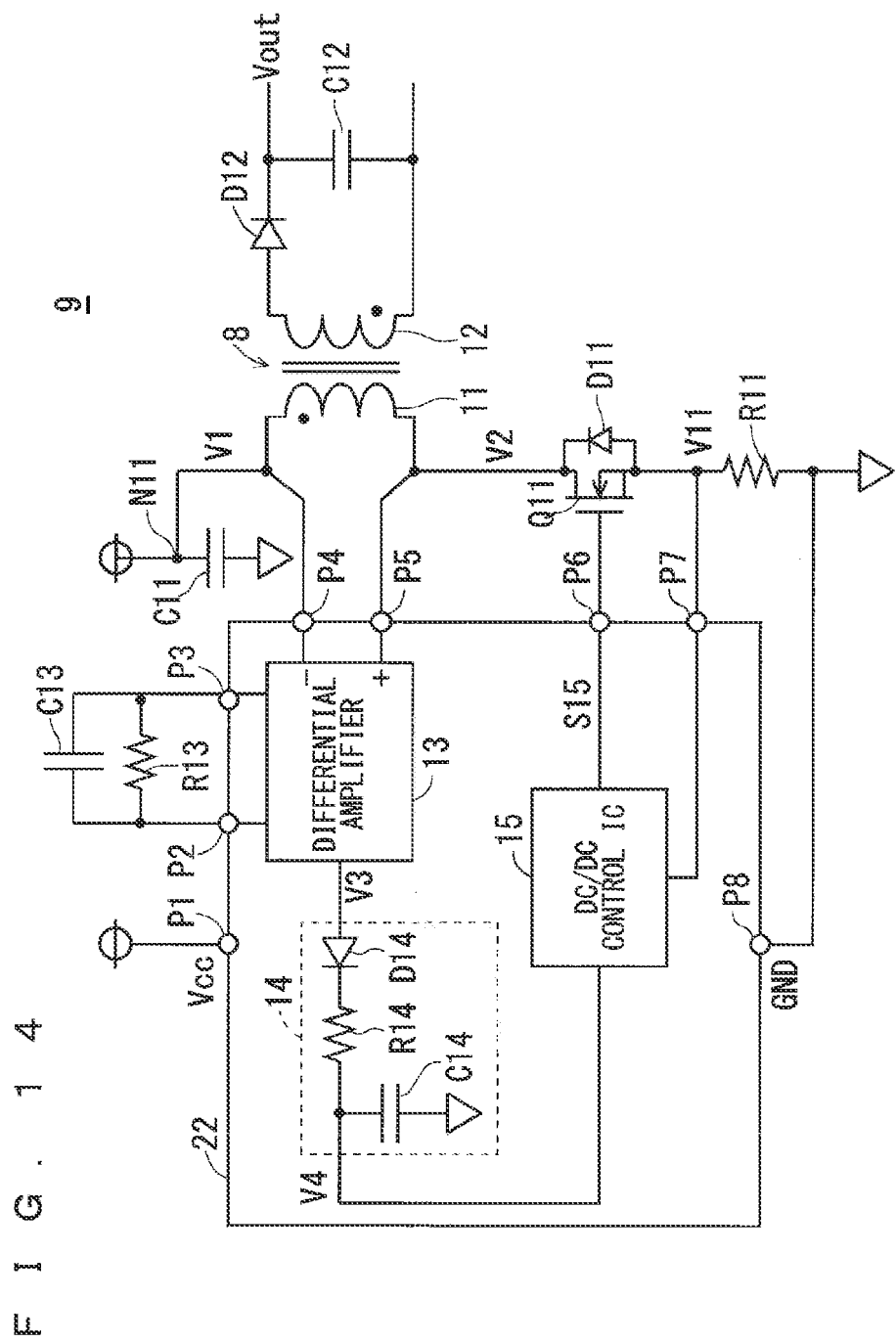
FIG. 14 is an explanatory diagram illustrating a configuration of a power supply circuit of a ninth embodiment of the present invention.

FIG. 14 is an explanatory diagram illustrating a configuration of a power supply circuit 9 (switching power supply device) of a ninth embodiment of the present invention.

As shown in the diagram, the differential amplifier 13, the H-detection filter circuit 14, and the DC/DC control IC 15 that form the switching control circuit in the first embodiment shown in FIG. 1 are integrated into one chip as a control IC 22.

The control IC 22 formed into the one chip includes external terminals P1 to P7, an operation power supply $V_{cc}$ being input from the external terminal P1, a resistor R13 and a capacitor C13 being provided in parallel between the external terminals P2 and P3. The external terminals P2, P3 are electrically connected to the differential amplifier 13, and an amplification factor of the differential amplifier 13 can be adjusted by modifying these capacitor C13 and resistor R13 (mainly the resistor R13).

The external terminal P4 is connected to the primary winding part 11 at one end outside and is connected to the negative input of the differential amplifier 13 inside. The external terminal P5 is connected to the primary winding part 11 at the other end outside and is connected to the positive input of the differential amplifier 13 inside.

The external terminal P6 is connected to the control electrode of the transistor Q11 outside and receives the PWM signal S15 inside. The external terminal P7 is grounded through a resistor R11 outside. The external terminal P7 is drawn into an overcurrent detecting part of the DC/DC control IC 15 inside.

In addition, the other configuration similar to the power supply circuit 1 shown in FIG. 1 is denoted by the same references, and description will be omitted as appropriate.

The power supply circuit 9 of the ninth embodiment having the configuration mentioned above has the circuit configuration equivalent to the power supply circuit 1 of the first embodiment, and thus the DC/DC control IC 15 (operation control part) performs the control process of controlling the on/off operation of the transistor Q11 based on the detection voltage V4 of the voltage detecting circuit 4, achieving effects similar to those in the first embodiment.

Furthermore, in the power supply circuit 9 of the ninth embodiment, the switching control circuit part is integrated into the one chip as the control IC 22, whereby resistance to a noise environment and space savings for the whole circuit can be achieved. Moreover, the control IC 22 can be miniaturized.

Furthermore, the switching control circuit is configured to be the control IC 22, achieving an effect that enables the power supply circuit 9 to be configured relatively easily.

In addition, the ninth embodiment shows the configuration including the switching control circuit of the first embodiment integrated into the control IC 22, and the switching control circuit of the power supply circuit 2 of the second embodiment, of the power supply circuit 5 of the fifth embodiment, and of the power supply circuit 6 of the sixth embodiment can be similarly formed into the one chip as the control IC.

In the second embodiment (see FIG. 3), a configuration including the differential amplifier 13, the H-detection filter circuit 14, the triangular wave generating circuit 16, and the comparison circuit 17 formed into the one chip as the control IC is conceivable. This case achieves the effects of the ninth embodiment, such as the resistance to the noise environment described above and the space savings for the whole circuit, in addition to the effects of the power supply circuit 2 of the second embodiment.

In the fifth embodiment (see FIG. 8), a configuration including the differential amplifier 13, the H-detection filter circuit 14, and the oscillator circuit 18 formed into the one chip as the control IC is conceivable. This case achieves the effects of the ninth embodiment, such as the resistance to the noise environment described above and the space savings for the whole circuit, in addition to the effects of the power supply circuit 5 of the fifth embodiment.

In the sixth embodiment (see FIG. 10), a configuration including the differential amplifier 13, the H-detection filter circuit 14, the oscillator circuit 19, and the comparison circuit 20 formed into the one chip as the control IC is conceivable. This case achieves the effects of the ninth embodiment, such as the resistance to noise environment described above and the space savings for the whole circuit, in addition to the effects of the power supply circuit 6 of the sixth embodiment.

<Others>

As to the power supply circuits illustrated in the first to ninth embodiments, the whole power supply circuit or the switching control circuit inside the power supply circuit has inherent effects of each embodiment.

While the invention has been shown and described in detail, the foregoing description is in all aspects illustrative and not restrictive. The present invention is not restricted to the material quality, the materials, the execution conditions and the like of the respective components which are described, for example. It is therefore understood the numerous modifications and variations can be devised without departing from the scope of the invention.

In addition, according to the present invention, the above embodiments can be arbitrarily combined, or each embodiment can be appropriately varied or omitted within the scope of the invention.

The invention claimed is:

1. A switching control circuit for a predetermined switching power supply device,
said predetermined switching power supply device including:
a transformer having a primary winding part and a secondary winding part; and
a switching element that converts a direct current input voltage into an alternating current voltage by an on/off operation to supply the alternating current voltage to said primary winding part,
said switching control circuit comprising:
a differential amplifier that differentially amplifies voltages at both ends of said primary winding part to obtain an amplified voltage;
a filter circuit that extracts low frequency components of said amplified voltage to obtain a detection voltage;
an operation control part that performs a control process of controlling the on/off operation of said switching element based on said detection voltage; and
a reference signal generating circuit that generates a reference signal changed over time from a first voltage to a second voltage higher than said first voltage,
wherein said operation control part includes a comparison circuit that compares a comparison reference signal and said detection voltage to obtain a pulse width modulation (PWM) signal and applies the PWM signal to a control electrode of said switching element to perform said control process, the comparison reference signal including said reference signal and a phase shift reference signal having a shifted phase of said reference signal.

2. The switching control circuit according to claim 1, wherein
said comparison circuit has a clamp function of clamping said detection voltage such that a minimum value of said detection voltage is higher than said first voltage and compares said detection voltage after clamping and said comparison reference signal to obtain said PWM signal.

3. The switching control circuit according to claim 1, wherein
said reference signal generating circuit has a reference signal lowering function of generating said reference signal having a voltage as said first voltage, the voltage being lower than a minimum value of said detection voltage.

4. The switching control circuit according to claim 1, wherein
said predetermined switching power supply device includes a plurality of switching power supply devices,
said differential amplifier, said filter circuit, and said operation control part form an operation control combination circuit,
said operation control combination circuit includes a plurality of operation control combination circuits provided correspondingly to said plurality of switching power supply devices, and
said reference signal generating circuit is shared between said operation control parts of said plurality of operation control combination circuits.

5. The switching control circuit according to claim 4, further comprising
a reference signal delay circuit that delays said reference signal by a predetermined time to output said phase shift reference signal, said reference signal delay circuit being shared between said operation control parts of said plurality of operation control combination circuits,
wherein said plurality of operation control combination circuits each selectively input one signal of said reference signal and said phase shift reference signal to said operation control part.

6. The switching control circuit according to claim 1, wherein at least said differential amplifier, said filter circuit, and said operation control part are formed into one chip as one integrated circuit.

7. A switching control circuit for a predetermined switching power supply device,
said predetermined switching power supply device including:
a transformer having a primary winding part and a secondary winding part; and
a switching element that converts a direct current input voltage into an alternating current voltage by an on/off operation to supply the alternating current voltage to said primary winding part,
said switching control circuit comprising:
a differential amplifier that differentially amplifies voltages at both ends of said primary winding part to obtain an amplified voltage;
a filter circuit that extracts low frequency components of said amplified voltage to obtain a detection voltage;
an operation control part that performs a control process of controlling the on/off operation of said switching element based on said detection voltage; and
a reference signal oscillator circuit that generates a reference oscillation signal oscillating at a reference frequency,
wherein said operation control part includes a comparison circuit that performs said control process based on a comparison result between a comparison oscillation signal and said detection voltage, said comparison oscillation signal including said reference oscillation signal and a phase shift reference oscillation signal having a shifted phase of said reference oscillation signal.

8. The switching control circuit according to claim 7, wherein
said predetermined switching power supply device includes a plurality of switching power supply devices,
said differential amplifier, said filter circuit, and said comparison circuit form an operation control combination circuit,
said operation control combination circuit includes a plurality of operation control combination circuits provided correspondingly to said plurality of switching power supply devices, and
said reference signal oscillator circuit is shared between said comparison circuits of said plurality of operation control combination circuits.

9. The switching control circuit according to claim 8, further comprising
a reference oscillation signal delay circuit that delays said reference oscillation signal by a predetermined time to output a phase shift reference oscillation signal, said reference oscillation signal delay circuit being shared between said comparison circuits of said plurality of operation control combination circuits,
wherein said plurality of operation control combination circuits each selectively input one signal of said reference oscillation signal and said phase shift reference oscillation signal to said comparison circuit.

10. A switching power supply device, comprising:
a switching control circuit;
a transformer having a primary winding part and a secondary winding part; and
a switching element that converts a direct current input voltage into an alternating current voltage by an on/off operation to supply the alternating current voltage to said primary winding part,
said switching control circuit comprising:
a differential amplifier that differentially amplifies voltages at both ends of said primary winding part to obtain an amplified voltage;
a filter circuit that extracts low frequency components of said amplified voltage to obtain a detection voltage;
an operation control part that performs a control process of controlling the on/off operation of said switching element based on said detection voltage; and
a reference signal generating circuit that generates a reference signal changed over time from a first voltage to a second voltage higher than said first voltage,
wherein said operation control part includes a comparison circuit that compares a comparison reference signal and said detection voltage to obtain a pulse width modulation (PWM) signal and applies the PWM signal to a control electrode of said switching element to perform said control process, the comparison reference signal including said reference signal and a phase shift reference signal having a shifted phase of said reference signal.

* * * * *